United States Patent [19]

Taoka et al.

[11] 4,315,724
[45] Feb. 16, 1982

[54] PROCESS AND MACHINE FOR MULTI-COLOR INJECTION MOLDING

[75] Inventors: Fumio Taoka; Norimichi Tanno; Hideo Watanabe, all of Tokyo, Japan

[73] Assignee: Kamaya Kagaku Kogyo Co., Ltd., Tokyo, Japan

[21] Appl. No.: 175,330

[22] Filed: Aug. 4, 1980

Related U.S. Application Data

[62] Division of Ser. No. 105,263, Dec. 19, 1979.

[51] Int. Cl.³ ............................................. B27F 1/10
[52] U.S. Cl. ..................................... 425/130; 264/74; 264/75; 264/245; 425/573
[58] Field of Search ................... 425/130, 133.1, 573; 264/74, 75, 245

[56] References Cited

U.S. PATENT DOCUMENTS 3,921,856  11/1975  Langeeker .................. 425/133.1 X Primary Examiner—Thomas P. Pavelko
Attorney, Agent, or Firm—Browdy and Neimark

[57] ABSTRACT

Process and machine for multi-color injection molding of plastic products having three-dimensional appearance of continuous or discontinuous multi-color patterns according to a preset program through injection of various kinds and/or colors of resins into a cavity, the resins being injected from at least three injection units, merged into and blended together in a molten resin mixing manifold. The multi-color injection molding machine has more than three injection units established around the molten resin mixing manifold. The manifold internally holds an arranging chamber, which received a resin from each injection unit and forms a compounded or layered resin flow. For the purpose of presenting intricate multi-color patterns according to a preset program, the arranging chamber is detachably mounted in the molten resin mixing manifold.

8 Claims, 18 Drawing Figures

PROCESS AND MACHINE FOR MULTI-COLOR INJECTION MOLDING

This is a division of application Ser. No. 105,263 filed Dec. 19, 1979.

FIELD OF THE INVENTION

The present invention relates to plastic shaping and, more particularly, to a process and a machine for multi-color molding, in which various kinds and colors of resins are injected from a plurality of injection units and enter into a molten resin mixing manifold and in the manifold a compounded or layered flow of various kinds and colors of resins is formed and is then charged into a mold cavity to form a multi-colored product.

BACKGROUND OF THE INVENTION

Two-color or three-color injection molding processes have been practiced, in which a mold is turned from side to side in order to receive two or three injection streams one after another from the injection nozzles; the product frame built from the beginning is filled with each colored resin at a selected area. There is another known process in which two-colored resins individually molten in two injection units are independently and simultaneously injected through one nozzle to form a color pattern. There is still another process of sandwich molding in which two resins different in kind are successively injected through a common sprue out of separate injection units.

Multi-color molded products with intricate designs for a high decorative effect are in demand. The conventional molding process and machine, however, cannot make a three-dimensional appearance of complex or intricate multi-color patterns with more than three colors.

SUMMARY OF THE INVENTION

It is therefore an object of the invention to overcome deficiencies in the prior art, such as mentioned above.

Another object is to provide decorative molded products of intricate designs.

It is a further object of the present invention to provide a multi-color molding process and machine capable of injection molding of a multi-color pattern of more than three colors without turning the mold from side to side.

Another object of the present invention is to provide a multi-color molding process and machine for producing a product with a multi-color pattern of at least three colors arranged in an overlapped fashion and presenting a three-dimensional appearance with continuous gradations of colors, with good reproducibility.

Still another object of the present invention is to provide a multi-color molding characterized by the ease of replacing the arranging chamber mounted in the molten resin mixing manifold and by the ease of obtaining various kinds of multi-color patterns without fluctuation merely by the replacement of the arranging chamber.

Still another object of the present invention is to provide a multi-color molding process and machine capable of producing multi-functional products through injection of a variety of resins adequate to the functions required by the products.

The above and further objects and novel features of the present invention will become more fully apparent from the following detailed description of embodiments of the invention when the same is read referring to the attached drawings. It is to be expressly understood, however, that the drawings are for the purpose of illustration only and are not intended as a definition of the limits of the invention.

DETAILED DESCRIPTION OF EMBODIMENTS

Figure 1:
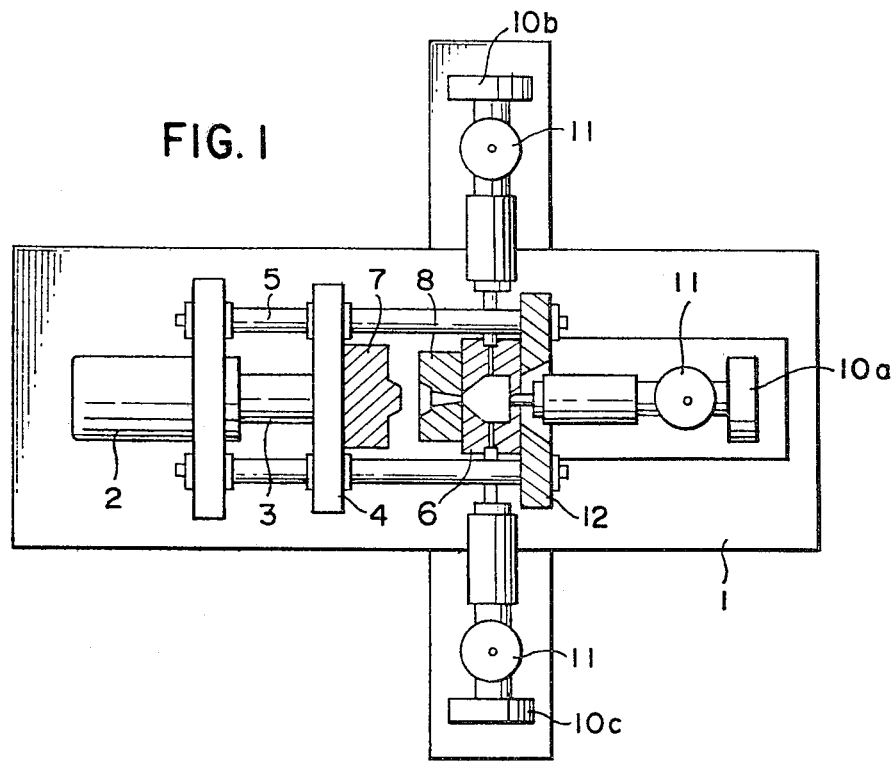
FIG. 1 is a partially abbreviated and broken schematic plan view of an embodiment of a multi-color molding machine of the present invention.
Figure 2:
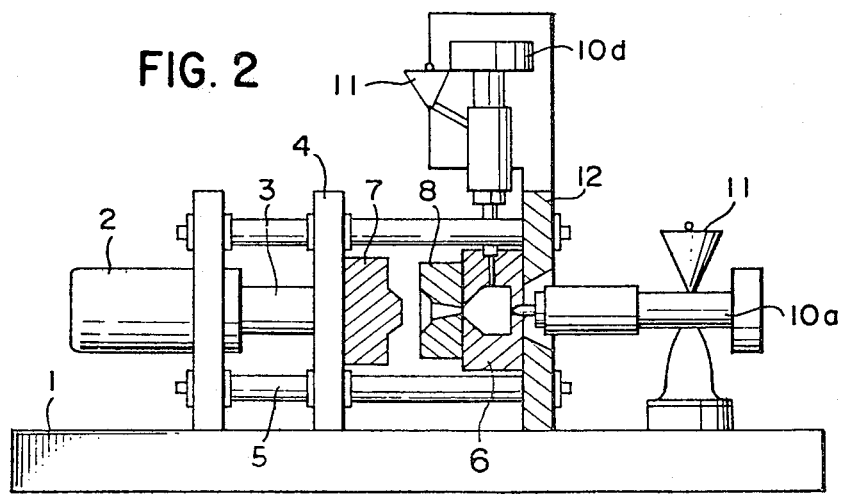
FIG. 2 is a side view corresponding to FIG. 1.

As one embodiment of the present invention, a four-color molding machine is schematically shown in FIGS. 1 and 2. A machine stand 1 is provided, the top of which is laterally fitted a ram cylinder 2 from which emerges the end of a piston rod 3 which is coupled to the piston of the cylinder 2 at one end and fixed to a movable plate 4 at the other end. The movable plate 4, driven by the ram, can therefore make a reciprocating motion guided by the guide bars 5. A movable mold 7 fixed to the movable plate 4 and a stationary mold 8, e.g. of metal, fixed to a molten resin mixing manifold 6, are opposed to each other. The movable mold 7 and the stationary mold 8 can mate or can move away from each other; when they come together, a molding cavity 9 (see FIGS. 8 and 9) is created between them. Around the molten resin mixing manifold 6 are arranged a series of injection units 10a, 10b, 10c, 10d with the hoppers 11 to contain various kinds and/or colors of resins.

Figure 3:
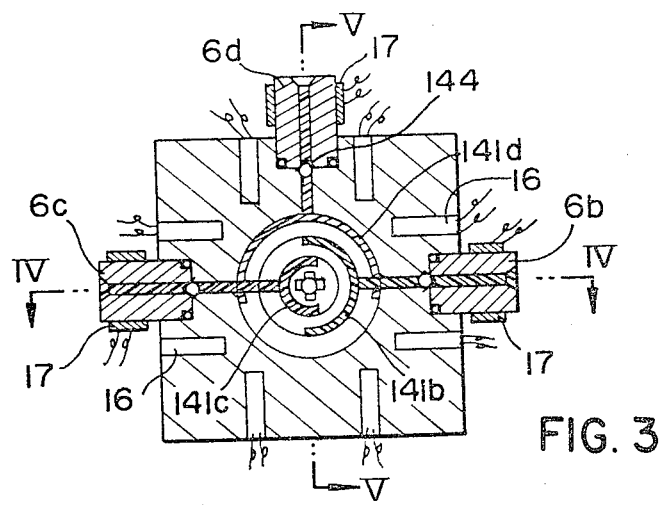
FIG. 3 is a schematic diagram illustrating the molten resin mixing manifold.
Figure 4:
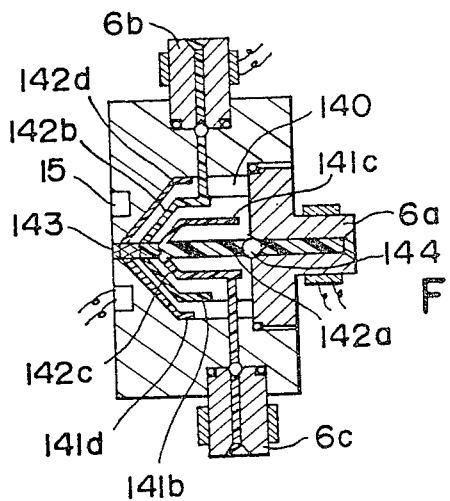
FIG. 4 is a sectional view taken along the line of IV—IV of FIG. 3.
Figure 5:
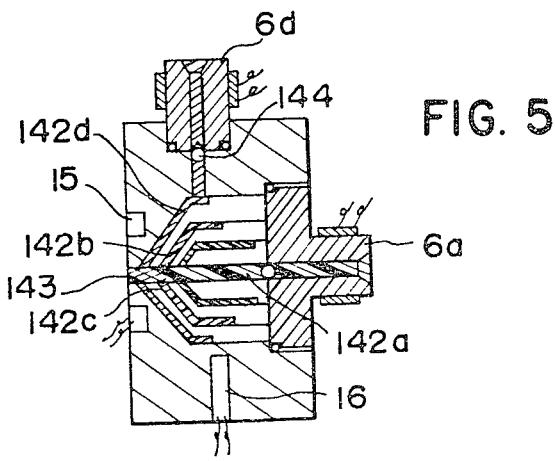
FIG. 5 is a sectional view taken along the line of V—V of FIG. 3.

As indicated in FIGS. 3 to 5, for a four-color machine, the molten resin mixing manifold 6 internally holds an arranging chamber 140 and carries a plurality of nozzle adaptors 6a, 6b, 6c, 6d on its four sides. The manifold 6 is equipped with a suitable space heater 15, a cartridge heater 16 and a band heater 17, with the temperature detected and controlled by a buried thermocouple (not shown) so that the molten resin can be kept at a suitable temperature for molding.

Figure 6:
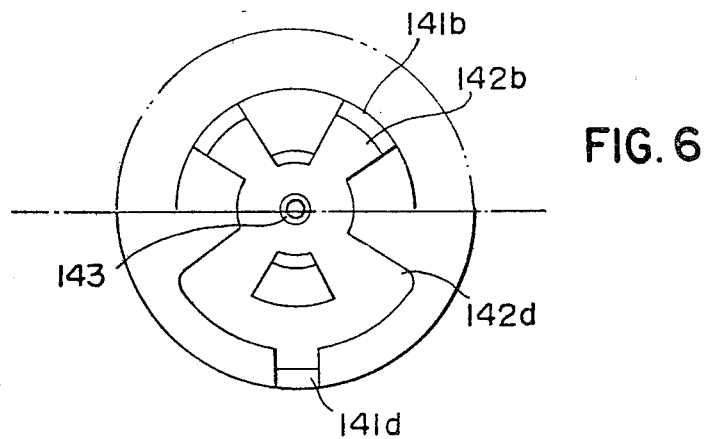
FIG. 6 is a front elevation view of the arranging chamber, with its upper half cut away, of the molten resin mixing manifold.
Figure 7:
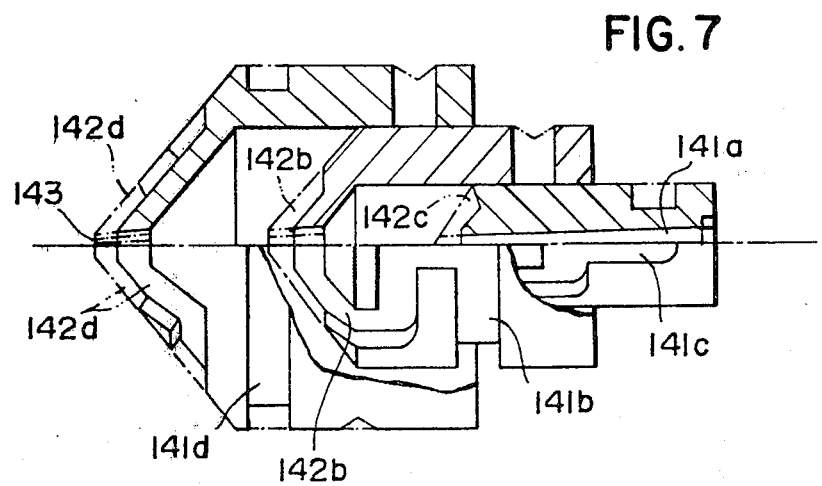
FIG. 7 is a partially broken assembly view of the arranging chamber with triple structure.

The arranging chamber 140, illustrated in FIGS. 6 and 7, is a triple structure in this example of four-color molding. It looks approximately like a cannonball having a column with one conical end. When this chamber 140 is placed into the molten resin mixing manifold 6, resin channels 141b, 141c, 141d, 142b, 142c, 142d are formed. The injection units 10a, 10b, 10c and 10d all have tip nozzles 14, each of which goes into a respective nozzle adaptor 6a, 6b, 6c, 6d; and these resin channels each communicate via a check valve 144 to resin introducing passages e.g. 141b, 141c, 141d, which represent semi-arc grooves branching off both ways at 90° on each cylinder surface. And, from both ends of the grooves, resin channels 142b, 142c, 142d extend toward the center, following the generatrix of each cone. Further these channels 142b, 142c, 142d, branching off both ways at 45° on each cone surface, constitute arc grooves. Again from both ends of the arc grooves, four grooves converge, going toward the center along the generatrix of cone and ultimately they become circular. The injection unit 10a connects with a resin channel 142a via the nozzle adaptor 6a and its check valve 144. At the tip of the channel 142a there is continuously provided a convergent resin channel 143 to converge the channels 142b, 142c, and 142d.

Figure 8:
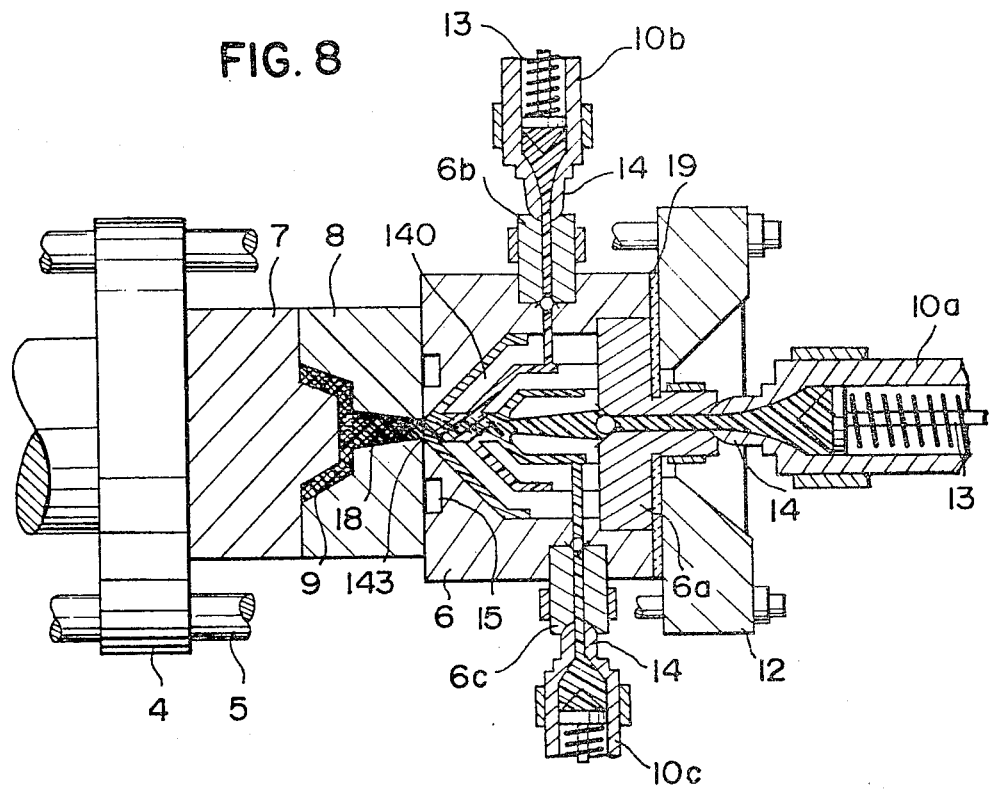
FIG. 8 is a partially enlarged view of the machine in FIG. 1.

FIG. 8 is an enlarged view of the principal parts in FIG. 1, and shows that the arranging chamber 140 is housed with the nozzle adaptor 6a screwed such that all the resin channels can converge into the molten resin mixing manifold 6. The nozzle adaptors 6b, 6c, 6d are similarly attached to the molten resin mixing manifold 6. The manifold 6 is attached via a heat-insulation plate 19 to the stationary plate 12, while on the opposite side it is attached to the stationary mold 8, with a sprue 18 and the convergent resin channel 143 aligned with each other, and with the arranging chamber 140 close to the cavity 9.

A molding process using the four-color molding machine thus constructed is carried out as follows: Initially, the molten resin mixing manifold 6 housing therewithin the arranging chamber 140, and attached to the stationary mold 8 having the cavity 9, and the injection units 10a through 10d, are heated by the aforementioned heaters to a suitable temperature optimum for injection molding of the particular resins to be injected. The temperature control for the manifold and these injection units largely influence resin flow, having a significant influence on reproduction of a desired pattern.

The injection units 10a, 10b, 10c, 10d melt colored resins A, B, C, D initially contained in the hoppers 11 by means of screws (or plungers) 13 and inject them through the nozzles 14. These resins are preferably materials of the same kind or with mutual solubility so that no peeling or cracking occurs in the resultant product. The resin of color A injected from the injection unit 10a goes from the nozzle adaptor 6a through the channels 142a, 143 to the sprue 18 and finally into the cavity 9. Meanwhile the resin of color B injected from the unit 10b goes from the nozzle adaptor 6b through the channels 141b, 142b, 143 to the sprue 18 and finally into the cavity 9. In the same way the resins of colors C, D flow from the units 10c, 10d to the cavity 9, and the cavity 9 ultimately becomes filled with the resins A, B, C, D. The movable mold 7 and the stationary mold 8 are cooled, and thereafter the product is taken out of the mold cavity 9. One cycle of injection molding is thus terminated.

Figure 12:
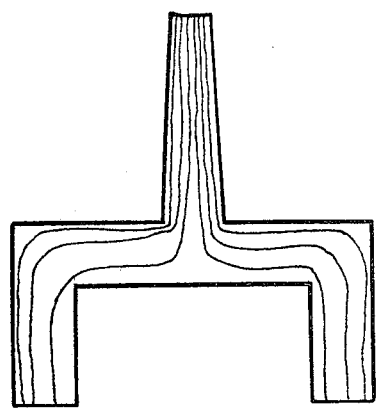
FIG. 12 is a diagram illustrating flows of resins continuously injected from each injection unit at the same time.

In one example of multi-color molding, the resin flow in the sprue 18 and the cavity 9 of the mold and the formation of a pattern are described referring to FIG. 11. This is the process in which a pattern is formed by discontinuously injecting colored resins in succession from the injection units by means of the arranging chamber 140, or for creating a resin flow of a concentric circular pattern in case of simultaneous injection as shown in FIG. 12. FIG. 11A indicates the state of a certain volume of one color being injected; FIG. 11B shows the state of a second color being injected after stoppage of the first color injection, whereby the second color flows centrally or inside of the first color and the first color flows, being spread along the walls of the sprue and the cavity, this theory being well-known; in FIG. 11C a third color flows inside of the second one and spreads as being in layers not blended with the other colors; FIG. 11D illustrates the state of a fourth color similarly flowing centrally, whereby the first and the second color resins are injected in small volumes, with the flow pushed apart at the tip and stuck to the upper and lower walls of the cavity and the third color forming the tip; FIG. 11E is the case where a fifth color flows centrally, pushing the tips of the third and fourth colors apart, and the cavity is filled up to the corners, with the result that both the third and fourth colors partially emerge on the outside of the product and the other part is layered.

When the product is, for instance, a round cap, the top surface presents an annular pattern and the side surface a striped pattern. If clear resins are employed, a molded product with a pretty multi-color pattern, presenting a three-dimensional appearance in which the lower layered colors are seen through the upper layered colors, can be obtained.

Unlike the mixed color molding machine which is long in length from the nozzle portion to the cavity, thus failing to maintain the resin flow in the optimum molten state, the four-color molding machine according to the present invention has a relatively short length from the arranging chamber 140 to the mold cavity 9 and therefore makes it possible to control the temperature in the molten resin mixing manifold and to fill the cavity with a molten resin at an appropriate temperature for molding; thus free from external influence, the machine can yield a multi-color pattern with good reproducibility.

FIG. 12 illustrates an example of a pattern obtained by simultaneous continuous injection by using the arranging chamber 140 which creates concentric circular resin flow under these conditions. In this example, when molten resins are simultaneously and continuously injected at the same time out of each unit, layers as shown are formed, which are arranged from inside to outside of the product in the sequence of convergence into the convergent resin channel of the arranging chamber. Namely, the resin layer from the unit 10a is centrally located, the other layers from the units 10c, 10b, 10d being formed outside in succession.

Figure 13:
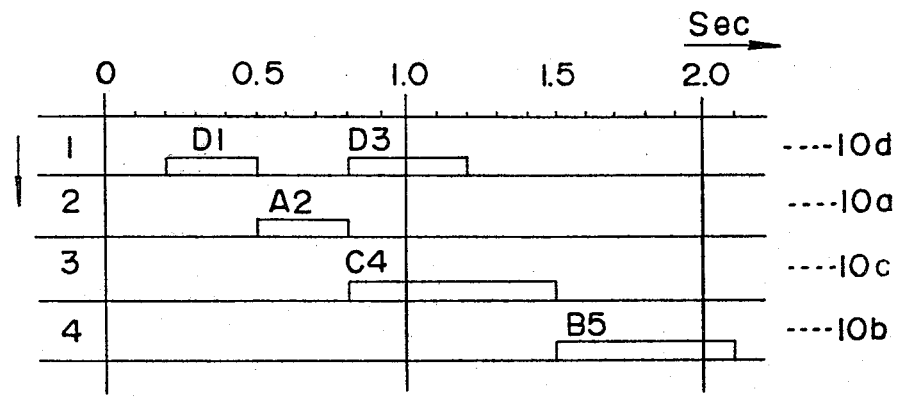
FIG. 13 is a four-color injection time chart.
Figure 14:
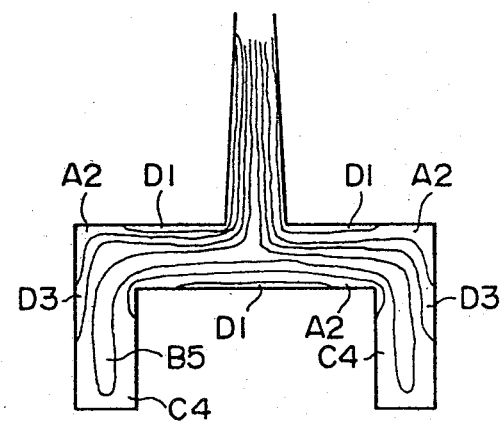
FIG. 14 illustrates multi-color patterns yielded according to the time chart of FIG. 13.

Next, referring to FIGS. 13 and 14, the formation of a multi-color pattern according to a simple programmed control of a four-color molding machine is described.

FIG. 13 illustrates an example of a four-color injection time chart. First, the color D of the injection unit 10d is injected for 0.3 second (D1), followed by a 0.3 second injection of the color A out of the injection unit 10a (A2); simultaneous injection of the colors D and C out of the units 10d and 10c, D for 0.4 second (D3) and C for 0.7 second (C4); and finally 0.6 second injection of the color B out of the unit 10b (B5).

From injection according to this time chart (FIG. 13) by means of the arranging chamber 140 of FIG. 7, wherein the resin flows such as to provide a cross section of concentric circles, there emerges a pattern with resin layers of the colors indicated in FIG. 14. This pattern resembles FIG. 11v but in the pattern of FIG. 14, obtained by continuous injection of two colors, simultaneously and in an overlapped fashion for a given duration, the layer D3 is not exposed inside of the product. The process of forming the color layers, which is combination of successive discontinuous injection and simultaneous continuous injection, is not described here in detail, but in view of the present description, it will now be readily apparent.

Various multi-color patterns can be produced by not only controlling according to this time chart or another, but also controlling the temperature of the heating cylinder, the pressure and speed of injection, and so forth. Also, various patterns can be obtained by using different structures of detachable arranging chambers. Thus, a number of different patterns are possible using the arranging chamber to provide resin flows having, e.g. radial, concentric, layered or stratified, dispersed cross sectional flows and their combinations whereby a variety of three-dimensional, multi-colored patterns can be easily obtained by injection control.

The present invention is not limited to the above example of four-color molding; other multi-color moldings can be accomplished by arrangement of a number of injection units around the molten resin mixing manifold in arbitrary direction and at arbitrary angle. Meanwhile, by changing the kind of resin, a multi-function product can be obtained; for instance, ones illustrated in FIGS. 12 and 14 which can serve various functions with the inner layer constituted of resins of high efficiency for sealing or oil-resistance and the outer layer constituted or decorative of weatherproof resins.

Figure 9:
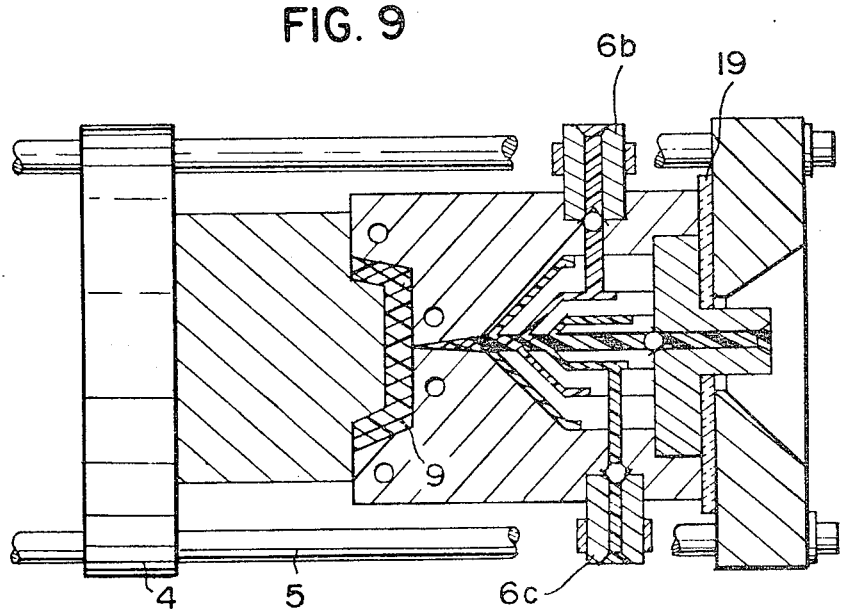
FIG. 9 is a similar view to FIG. 8, showing a machine using a runnerless mold.

FIG. 9 illustrates a case of using a sprue-less mold and integrating the molten resin mixing manifold with the stationary mold, whereby the resin channel up to the cavity can be shortened with higher reproducibility of pattern and a more economical consumption of resin.

Figure 10:
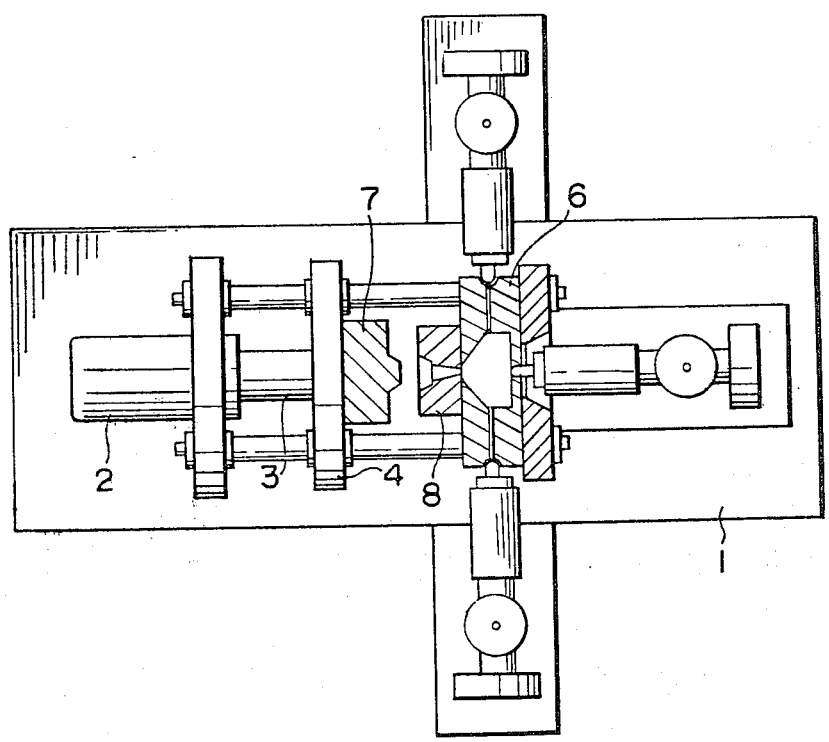
FIG. 10 is a similar view to FIG. 1, showing the molten resin mixing manifold combined with the stationary plate.
Figure 11A:
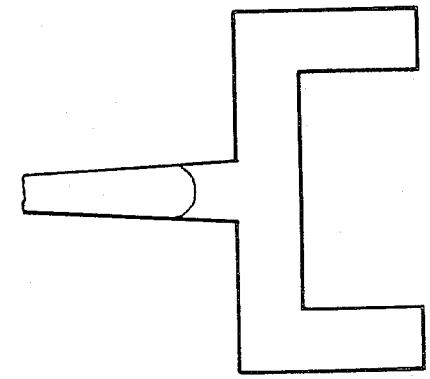
FIG. 11 is a series of diagrams illustrating flows of resins discontinuously injected from each injection unit.
Figure 11B:
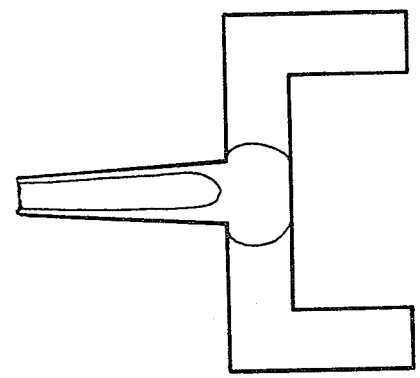
Figure 11C:
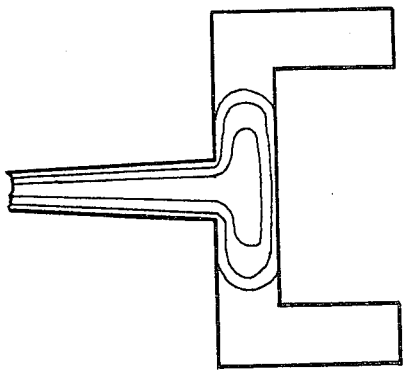
Figure 11D:
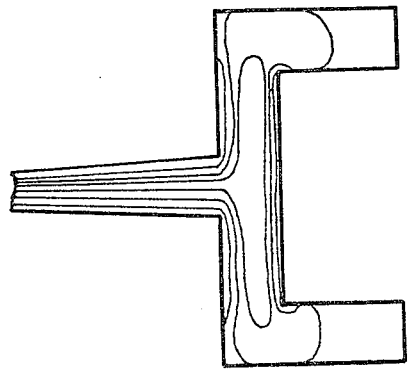
Figure 11E:
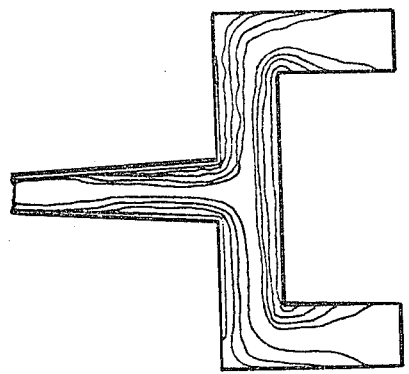

FIG. 10 illustrates a combined structure of the molten resin mixing manifold 6 and the stationary plate 12. The manifold 6 has a wide surface to fit the stationary mold 8 and thus so long as an ordinary injection mold is fitted with the surface, the multi-color molding is made possible. This combined structure prevents from the considerable troubles attendant upon electric terminal connections for the control of the temperature and other works required every time the mold is changed.

The molding process according to the present invention can be exploited as a means of giving a decorative effect to a semi-finished product. A semi-finished product with a concave portion to be decorated is appropriately inserted in the cavity of the mold and a multi-color patterned product can be obtained by filling the desired concave portion with at least three different colored resins, similarly, a multifunctional product can be obtained by using an appropriate resin as the filler at one molding cycle.

An important feature of the present invention lies in the fact that various kinds and/or colored resins are injected from more than three injection units arranged around the molten resin mixing manifold and made to converge in the molten resin mixing manifold having an arranging chamber which creates a desired resin flow, wherein a compounded or layered flow of these resins is formed by independently controlling the resin injected from individual injection units; and a multi-color molding is accomplished by filling the cavity of the mold with the resin. Thus a multi-color molded product with a three-dimensional multi-color pattern formed under injection control according to a preset program without an irregular blending of various kinds of and colored resins can be obtained. In this way an attractive multi-color patterned molded product can be obtained with good reproductibility by a contribution of control of each injection unit using the arranging chamber in the molten resin mixing manifold.

The foregoing description of the specific embodiments will show fully the general nature of the invention so that others can, by apply current knowledge, readily modify and/or adapt for various applications such specific embodiments without departing from the generic concept, and, therefore, such adaptations and modifications should and are intended to be apprehended within the meaning and range of equivalents of the disclosed embodiments. It is to be understood within the phraseology or terminology implicit herein are for the purpose of description and not of limitation.

What is claimed is:

1. A multi-color injection molding machine comprising:
    at least three injection units for injecting three different molten resins;
    a molten resin mixing manifold around which said at least three injection units are disposed, said molten resin mixing manifold having resin passages communicated through the medium of check valves with respective nozzles of respective injection units, and a temperature at said molten resin mixing manifold being controllable;
    an arranging chamber removably built in said molten resin mixing manifold and having a gathered resin channel at which said respective resin passages join each other;
    a stationary mold attached to said molten resin mixing manifold and having resin passages communicated with said gathered resin channel of said arranging chamber;
    a movable mold adapted to reciprocate in an opposed relation to said stationary mold and having a cavity adapted to communicate with the resin passages in said arranging chamber when mated with said stationary mold; and
    an injection control means for controlling the sequences of injection of molten resins from said at least three injection units individually and independently but under precise correlative control.

2. A multi-color injection molding machine as defined in claim 1, wherein said arranging chamber is a three-piece structure comprising: a generally cannonball-shaped hollow outer piece having a conical end facing said stationary mold, and having a plurality of resin guiding surface grooves therein; a hollow central piece of external shape generally complementary to the interior of said outer piece and lying therewithin, said central piece having a plurality of resin guiding surface grooves therein; and an inner piece of external shape generally complementary to the interior shape of said central piece; said inner piece having a plurality of resin guiding surface grooves therein.

3. A multi-color injection molding machine as defined in claim 1, wherein said at least three injection units are disposed around said molten resin mixing manifold in a desired angular relationship to each other.

4. A multi-color injection molding machine as defined in claim 1, wherein the molten resin mixing and the stationary mold are formed integrally as a runnerless mold reduced in a length from the gathered resin channel of the arranging chamber to the cavity.

5. A multi-color injection molding machine as defined in claim 1, wherein the arranging chamber consists of at least a single sleeve, and the resin passages for color resins leading from respective injection units to the cavity being completed when said arranging chamber is built in said molten resin mixing manifold.

6. A multi-color injection molding machine as defined in claim 5, wherein respective resin passages in the arranging chamber have a sector-shaped cross section at one end communicating with the cavity and are arranged in the circular shape.

7. A multi-color injection molding machine as defined in claim 5, wherein part of said resin passages in the arranging chamber has an annular cross section at one end communicated with the cavity, and the ends of other resin passages are located within said annular shape at a spacing from each other.

8. A multi-color injection molding machine as defined in claim 5, wherein the resin passages in the arranging chamber have a circular cross section at one end communicated with the cavity and are arranged concentrically.

* * * * *